Feb. 3, 1942.　　　　E. C. NOEL　　　　2,272,127
ILLUMINATED SIGN
Filed Jan. 9, 1941　　　　2 Sheets-Sheet 1

Inventor
Edward C. Noel
By [signature]
Attorney

Feb. 3, 1942.  E. C. NOEL  2,272,127
ILLUMINATED SIGN
Filed Jan. 9, 1941   2 Sheets-Sheet 2
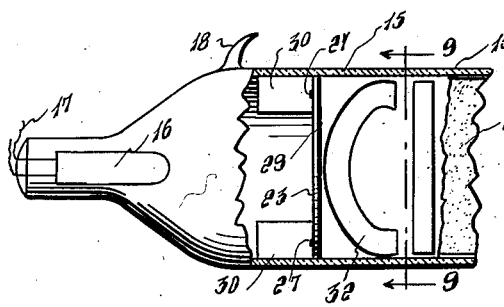
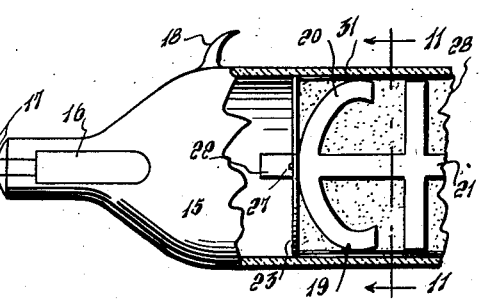
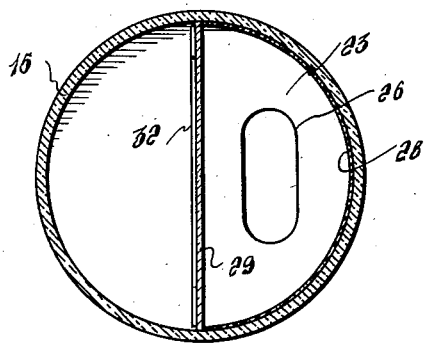
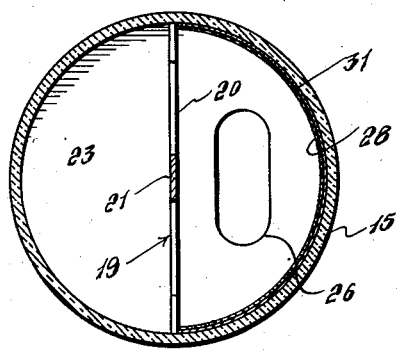
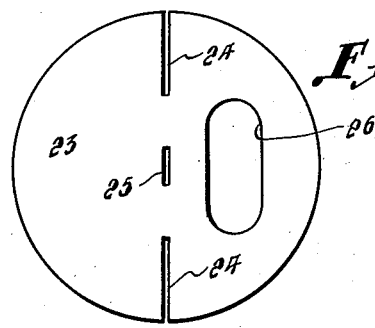
Inventor
Edward C. Noel Patented Feb. 3, 1942

2,272,127

UNITED STATES PATENT OFFICE 2,272,127

ILLUMINATED SIGN

Edward C. Noel, Los Angeles, Calif.

Application January 9, 1941, Serial No. 373,843

8 Claims. (Cl. 176—14)

This invention relates to improved illuminated tubular signs of glass construction, and particularly to a low pressure gaseous tube sign of the ionic discharge type in which ultra-violet rays are generated by a discharge from electrodes disposed in the ends of the tube and which cause the fluorescence of an active material disposed within the tube close to the path of the discharge.

More particularly, it is an aim of the invention to provide a new and attractive display sign capable of emitting several distinct colors of light to form desired characters for advertising matter, independent of the light color emitted by the gaseous element contained within the tube.

Still another aim of the invention is to provide novel means for controlling the path of the electrical discharge to cause it to pass adjacent to the fluorescent material to be excited thereby to produce the maximum of luminosity thereof.

Figure 1:
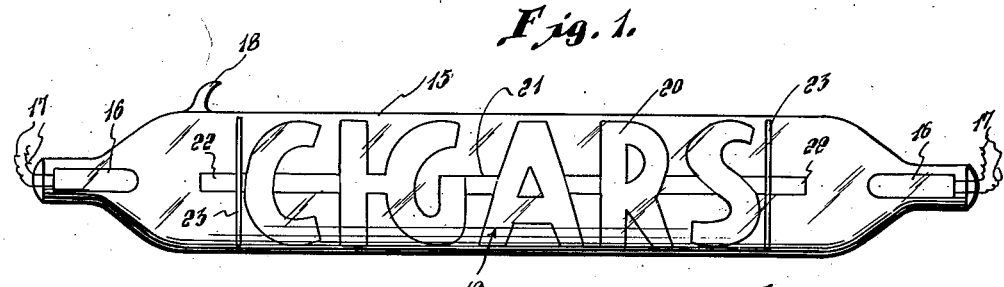
Figure 2:
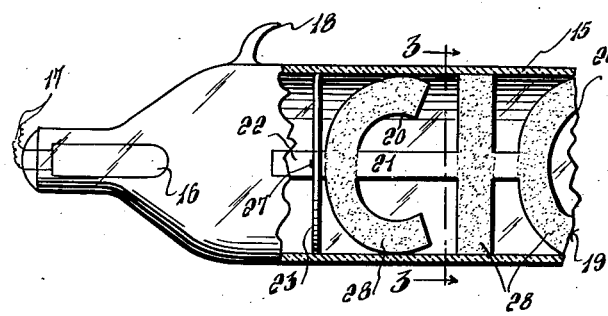
Figure 3:
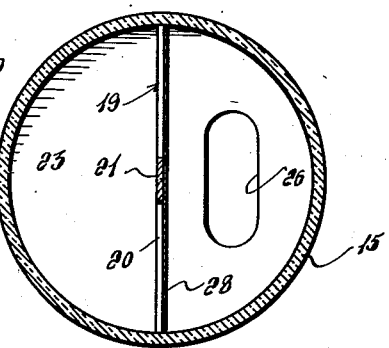
Figure 4:
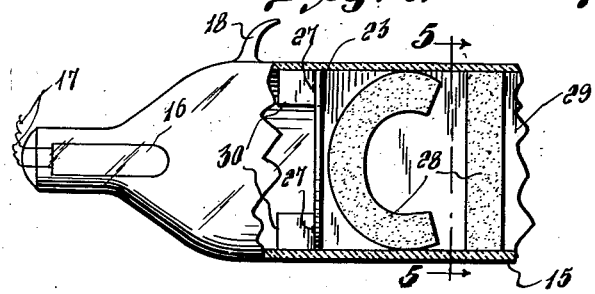
Figure 5:
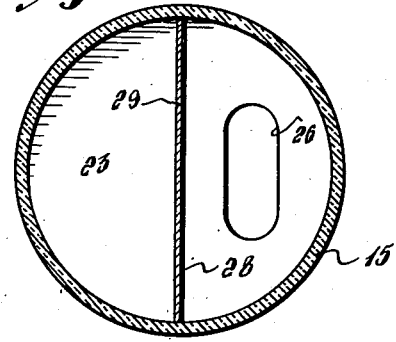

Other objects and advantages of the invention will hereinafter become more fully apparent from the following description of the drawings, which illustrate preferred embodiments thereof, and wherein:

Figure 1 is a side elevational view of an illuminated display sign constructed in accordance with the invention, Figure 2 is an enlarged fragmentary longitudinal vertical sectional view, partly in elevation of the same, Figure 3 is an enlarged transverse sectional view taken substantially along the plane of the line 3—3 of Figure 2, Figure 4 is a view similar to Figure 2 of another embodiment of the invention, Figure 5 is an enlarged transverse sectional view taken substantially along the plane of the line 5—5 of Figure 4, Figure 6 is a view similar to Figure 2 of another embodiment of the invention, Figure 7 is an enlarged transverse sectional view taken substantially along the plane of the line 9—9 of Figure 8, Figure 8 is a view of another form of the invention, similar to Figure 2, Figure 9 is a transverse sectional view, on an enlarged scale, taken substantially along the plane of the line 11—11 of Figure 10, and Figure 10 is a plan view of one of the disk shaped supporting members.

Referring more particularly to the drawings, wherein like reference characters designate like or corresponding parts throughout the different views, and particularly to Figure 1, a tube of transparent material, designated 15, such as glass, is provided with electrodes 16, one of which is sealed in each end thereof and which are connected to a suitable source of electric current by the wiring 17. The tube 15 is constructed in a conventional manner well known to the art, being first evacuated and then filled with a gas at a reduced pressure to which may be added a small amount of mercury after which the tube is sealed at the nipple 18. The gas with which the tube is filled in an inert gas such as neon, argon, helium, krypton, or xenon, or a mixture of such gases and mercury.

In the embodiment of the invention, illustrated in Figures 1 to 3, a cut-out object, designated generally 19, is disposed in the tube 15 lengthwise thereof. The object 19 may be made of glass, mica, or other suitable material which is capable of withstanding the high temperature necessary in the evacuation of the tube 15 and which, in the operation of the sign, as will hereinafter be described, will not affect the purity of the gas contained within the tube. The cut-out object 19 is composed of the letters forming the legend "Cigars" the letters 20 of which are connected by the portions 21 with the end letters thereof provided with projecting tabs 22 which project from the ends of the legend and which, with the portions 21, form parts of the cut-out object 19. A pair of disk shaped supporting members 23, formed of a similar material to the cut-out object 19, are mounted in the tube 15, one adjacent each end thereof. The circumference of the supporting members 23 is substantially equal to the circumference of the inner wall of the tube 15 and said members are disposed transversely thereof to form walls for dividing the intermediate portion of the tube 15, containing the cut-out object 19, from the end portions thereof which contain the electrodes 16. The disk shaped supporting members 23, as best seen in Figure 14, are provided with diametrically opposed radially extending slots 24 which extend inwardly of the peripheries of the supporting members 23. The disk shaped supporting members 23 are also each provided with a slot 25 in the center thereof which is disposed in alinement with the slots 24, the ends of which slot 25 are disposed in spaced relationship to the adjacent ends of the slots 24. Disk shaped supporting members 23 are also each provided with an oblong opening 26 disposed to one side of the slots 24 and 25 and in parallel relationship thereto. The disk shaped supporting members 23 are disposed in the tube 15, of Figures 1 to 3, with the slots 24 and 25 substantially perpendicular and with the openings 26 adjacent the forward part of the tube 15. The tabs or extensions 22 extend through the slots 25 for mounting the cut-out object 19 on the supporting members 23 and said tabs 22 are provided with pins 27 which are disposed on the outer sides of the supporting members 23 for connecting the tabs 22 thereto. The forward sides of the letters 20 are provided with a coating of fluorescent material, as indicated at 28, in Figure 2, comprising a fluorescent alkaline earth silicate such as cadmium, beryllium or zinc silicates, according to the colors of light desired, with a suitable binder such as a weak sodium silicate solution. These materials also must be capable of withstanding the high temperature of the tube evacuation and incapable of affecting the low pressure gas contained within the tube when the electrodes 16 are energized. The openings 26 are arranged to form connecting passages between the intermediate portion and the ends of the tube 15 for the ultra-violet discharge between the electrodes 16 when such electrodes are energized which discharge will pass in a straight line between the openings 26 and therefore in close proximity to the fluorescent coating 28 so that the radiation from the discharge will cause the fluorescent material 28 to become luminous. It will thus be apparent that when the electrodes 16 are energized the legend "Cigars" will be illuminated and caused to glow within the tube 15 in a desired color depending upon the material from which the fluorescent material 28 is compounded.

In the embodiment of the invention shown in Figures 4 and 5, the cut-out object 19 is omitted and an elongated strip or plate 29, formed of a similar material to the cut-out object 19, is disposed lengthwise and perpendicular in the tube 15. The plate or strip 29 is provided with projecting tabs 30 at its ends and adjacent its upper and lower edges which extend through the slots 24 of the disk shaped supporting members 23 and which are attached thereto by pins 27. It will thus be seen that the strip or plate 29 can be mounted in the tube 15 by means of a pair of the supporting members 23 which, as seen in Figure 5, are arranged so that their openings 26 are adjacent the forward portion of the tube 15. The forward side of the plate 29 is inscribed with fluorescent material to form the legend "Cigars." It will be apparent that when the electrodes 16 are energized the electric discharge therebetween will pass in a direct line between and through the openings 26 and adjacent the forward side of the plate 29 to excite and cause the fluorescent material 28 to become luminous.

In the form of the invention shown in Figures 8 and 9, a plate 29 is mounted in the tube 15 by means of a pair of supporting disks 23 in the same manner, as illustrated in Figures 4 and 5, and as previously described. In this form of the invention, the plate 29 is either rendered opaque to outline and form the transparent lettering 32 which forms the legend "Cigars" or the letters 32 may be made opaque and the remainder of the plate 29 left transparent. The inner side of the back half of the tube 15 is solidly coated, between the disks 23, with a fluorescent material 28 and the disks 23, as seen in Figure 9, are arranged so that the openings 26 will be disposed adjacent the back part of the tube 15 so that the electric discharge will pass adjacent to the fluorescent material 28 to cause the material to be illuminated to thereby illuminate the back portion of the tube 15 to cause the letters 32, if transparent, to glow, or if the letters 32 are opaque to cause the remainder of the plate 29 to be illuminated so that the letters 32 will stand out in silhouette.

In the form of the invention shown in Figures 10 and 11, the cut-out object 19 is mounted in the tube 15 by means of a pair of supporting disks 23, in the same manner as illustrated in Figures 1 to 3. The letters 20 of the cut-out object 19 are rendered opaque and a strip 31 is disposed in the back half of the tube 15 behind the cut-out object 19 and between the supports 23 and is entirely coated on its inner side with a fluorescent material 28. As in the form shown in Figures 8 and 9, the openings 26 are arranged adjacent the back portion of the tube 15 so that the radiation of the electrical discharge passing between the electrodes 16 will cause the material 28 to become luminous so that the opaque letters 20 will stand out in silhouette. It will be obvious, that in the form shown in Figures 10 and 11 instead of providing the strip 31 the inner side of the back half of the tube 15 could be coated with the fluorescent material and in the form shown in Figures 8 and 9 the strip 31 could be employed and coated with the fluorescent material, as in Figures 10 and 11, in lieu of coating the inner side of the back half of the tube 15 with the fluorescent material.

It will likewise be obvious that the illuminated legend may be of different colors. Obviously, any desired legend, symbol or mark desired to be used in sign advertising may be substituted for the legend "Cigars" which has only been employed for the purpose of illustration.

It is desirable that the gas with which the tube 15 is filled be of a type that will produce little or no coloring when the electrodes 16 are energized so that it will not distract from the illuminated sign.

Various modifications and changes are contemplated and may obviously be resorted to as only preferred embodiments of the invention have been disclosed.

I claim as my invention:

1. An electric display sign for use with a sealed, transparent container containing a charge of an inert gas at a reduced pressure and having electrodes adjacent the ends thereof to produce an ultra-violet discharge therebetween when the electrodes are energized, comprising a cut-out object, forming suitable characters, disposed within the container and provided on its forward side with a coating of fluorescent material to be illuminated by the discharge, supporting members disposed between the ends of the cut-out object and the electrodes and forming partitions dividing the intermediate portion from the end portions of the tube, said cut-out object having extending tabs at its ends engaging the supporting members, and said supporting members having alined openings for the passage of the discharge arranged to cause the discharge to pass in front of and adjacent the fluorescent material.

2. An electric display sign for use with a sealed, transparent container containing a charge of an inert gas at a reduced pressure and having electrodes adjacent the ends thereof to produce an ultra-violet discharge therebetween when the electrodes are energized, comprising a strip of flexible material disposed in and frictionally engaging the rear portion of the container, and the inner, forward side of said strip being coated with a fluorescent material to be rendered luminous by the discharge.

3. An electric display sign for use with a sealed, transparent container containing a charge of an inert gas at a reduced pressure and having electrodes adjacent the ends thereof to produce an ultra-violet discharge therebetween when the electrodes are energized, comprising an elongated strip disposed within and lengthwise of the container, supporting members mounted in the container, transversely thereof, and connected to the ends of said strip for supporting it in an upright position in the container, said supporting members forming partitions dividing the intermediate portion of the container from the ends thereof, the inner side of the rear portion of the container, behind said strip, being coated with a fluorescent material, said strip having opaque and transparent portions, and said supporting members having alined openings for the passage of the discharge arranged to cause the discharge to pass adjacent the fluorescent material to illuminate the material to thereby illuminate the transparent portions of said strip.

4. An electric display sign for use with a sealed, transparent container containing a charge of an inert gas at a reduced pressure and having electrodes adjacent the ends thereof to produce an ultra-violet discharge therebetween when the electrodes are energized, comprising an elongated strip disposed within and lengthwise of the container, supporting members mounted in the container, transversely thereof, and connected to the ends of said strip for supporting it in an upright position in the container, said supporting members forming partitions dividing the intermediate portion of the container from the ends thereof, a strip of flexible material disposed within and frictionally engaging the rear portion of the container and disposed behind said strip, the inner side of said last mentioned, flexible strip being coated with a fluorescent material, said strip having opaque and transparent portions, and said supporting members having alined openings for the passage of the discharge arranged to cause the discharge to pass adjacent the fluorescent material to illuminate the material to thereby illuminate the transparent portions of said strip.

5. An electric display sign for use with a sealed, transparent container containing a charge of an inert gas at a reduced pressure and having electrodes adjacent the ends thereof to produce an ultra-violet discharge therebetween when the electrodes are energized, comprising an elongated plate disposed in said container and extending longitudinally thereof, supporting members connected to the ends of said plate and disposed transversely of the container forming walls separating the intermediate portion of the container from the ends thereof, said plate being coated on its forward side with a fluorescent material, and said supporting members being provided with alined openings arranged to cause the discharge to pass adjacent the fluorescent material.

6. An electric display sign for use with a sealed, transparent container containing a charge of an inert gas at a reduced pressure and having electrodes adjacent the ends thereof to produce an ultra-violet discharge therebetween when the electrodes are energized, comprising an elongated cut-out member disposed within and lengthwise of the container, said cut-out member being opaque, supporting members connected to the ends of said cut-out member and disposed transversely of the container forming walls dividing the intermediate portion of the container from the ends thereof, a fluorescently coated portion disposed behind and spaced from the cut-out member, and said walls being provided with alined openings arranged to permit the ultra-violet discharge to pass adjacent the fluorescently coated portion to render said portion luminous to cause the cut-out member to appear in silhouette.

7. An electric display sign for use with a sealed, transparent tube containing a charge of an inert gas at a reduced pressure and having electrodes adjacent the ends thereof to produce an ultra-violet discharge therebetween when the electrodes are energized, comprising disk shaped members mounted in the tube and adjacent the ends thereof and forming walls for dividing the intermediate portion of the tube from the ends thereof, said walls being disposed between the electrodes, and means connected to said walls and disposed therebetween containing a coating of fluorescent material, and said walls being provided with alined apertures for the passage of the ultra-violet discharge, said openings being arranged to cause the discharge to pass adjacent the fluorescent material to render the fluorescent portion luminous.

8. An electric display sign for use with a sealed, transparent tube containing a charge of an inert gas at a reduced pressure and having electrodes adjacent the ends thereof to produce an ultra-violet discharge therebetween when the electrodes are energized, comprising supporting end sections mounted entirely within the tube and between the electrodes and combining with the tube to form end electrode containing chambers and an intermediate chamber, and means connected to and supported thereby in the intermediate chamber, said means having a coated portion of fluorescent material to be excited by the discharge between the electrodes for rendering the fluorescent material luminous, and said supporting sections being constructed to cause the discharge to pass through the intermediate chamber adjacent to said fluorescently coated portion.

EDWARD C. NOEL.